(12) United States Patent
Kramer

(10) Patent No.: US 7,011,185 B2
(45) Date of Patent: Mar. 14, 2006

(54) LOW COST BRAKE SENSOR

(75) Inventor: Dennis A. Kramer, Troy, MI (US)

(73) Assignee: Meritor Heavy Vehicle Technology, LLC, Troy, MI (US)

( * ) Notice: Subject to any disclaimer, the term of this patent is extended or adjusted under 35 U.S.C. 154(b) by 396 days.

(21) Appl. No.: 10/225,994

(22) Filed: Aug. 22, 2002

(65) Prior Publication Data

US 2002/0189908 A1    Dec. 19, 2002

Related U.S. Application Data

(63) Continuation of application No. 09/293,244, filed on Apr. 16, 1999, now Pat. No. 6,494,297.

(51) Int. Cl.
  *F16D 66/00*    (2006.01)
(52) U.S. Cl. .............................. 188/1.11 L; 188/1.11 E
(58) Field of Classification Search ........... 188/1.11 L, 188/1.11 W, 1.11 E, 1.11 R; 340/453, 454
  See application file for complete search history.

(56) References Cited

U.S. PATENT DOCUMENTS

| | | | |
|---|---|---|---|
| 3,088,549 A | 5/1963 | Borsa | |
| 3,556,258 A | 1/1971 | Winge | |
| 3,674,114 A | 7/1972 | Howard | |
| 4,241,603 A | 12/1980 | Han | |
| 4,391,350 A | 7/1983 | Moriya | |
| 4,869,350 A | 9/1989 | Fargier | |
| 5,015,990 A | 5/1991 | Reede | |
| 5,133,431 A | 7/1992 | Braun | |
| 5,151,681 A | 9/1992 | Valmir | |
| 5,833,033 A * | 11/1998 | Takanashi | 188/1.11 L |
| 5,839,545 A | 11/1998 | Preston | |
| 6,193,020 B1 | 2/2001 | Takanashi | |

FOREIGN PATENT DOCUMENTS

JP        6-2721    *  1/1994

* cited by examiner

*Primary Examiner*—James McClellan
*Assistant Examiner*—Bradley T. King
(74) *Attorney, Agent, or Firm*—Carlson, Gaskey & Olds

(57) ABSTRACT

A low cost brake sensor incorporates a sensor portion extending through one of the rivet holes in the backing plate of the brake pad. A locking sleeve snaps onto the sensor portion and secures the sensor to the backing plate. Preferably, the locking sleeve has a lip which snaps into a groove in an outer periphery of a sensor portion. The present invention thus provides a relatively low cost and secure way for attaching the sensor to the brake pad. No modification of the lining or the backing plate is necessary.

15 Claims, 2 Drawing Sheets

LOW COST BRAKE SENSOR

REFERENCE TO RELATED APPLICATIONS

This application claims the benefit of commonly assigned U.S. appln. Ser. No. 09/293,244, filed Apr. 16, 1999, now U.S. Pat. No. 6,494,297, issued Dec. 17, 2002.

BACKGROUND OF THE INVENTION

This invention relates to a relatively low cost sensor which is easily and securely mounted to a brake pad.

Brakes in modem vehicles typically include a replaceable brake pad with a friction material added to a metal backing plate. One main type of such brake pads is for use in a cam-type brake. In these type brakes, a brake table provides the backing plate and is generally curved along the circumference of a vehicle wheel. A friction material is formed on the top surface of the table and is selectively brought into contact with the wheel.

In another type of brake, a generally planar disc is selectively brought into contact with a rotating member. The discs have friction material formed on a backing plate.

In either type of brake, the friction material is typically riveted to the underlying metal backing plate. The friction material wears with use of the brake, and it is desirable to have a sensor for indicating when the friction material has worn. These sensors provide operator feedback of when the brake pads should be replaced. The sensors have used many diverse algorithms and techniques to identify wear.

In the past, monitoring the sensors have required relatively complex and expensive structures. Often the proposed sensors have necessarily changed the formation of the friction material or the backing plate. Further, the prior art sensors have often required expensive and unique electrical connectors.

As one example, the sensors have sometimes been threaded devices which require threading of the backing plate. This is expensive and undesirable. Some proposed sensors have been inserted through the lining in the brake, and thus require modification to the lining. Such sensors have often required a pigtail connector design, with the connector being attached by the brake pad manufacturer. Further, this type sensor has often required miniaturized connector designs. All of the above result in a brake that is undesirably expensive and less robust than would be desired.

SUMMARY OF THE INVENTION

In a disclosed embodiment of this invention, a sensor is attached to a hole in the backing plate, and most preferably, to one of the rivet holes in the backing plate. That is, one of the rivet holes which typically receives a rivet to secure the friction material to the plate is left without a rivet. The sensor is mounted in the rivet hole. The sensor preferably has an outer shoulder which abuts a rear face of the backing plate, and a forwardly extending sensor portion extending through the hole in the backing plate. Preferably, the forwardly extending portion has an outer diameter that is smaller than the inner diameter of the hole.

The sensor is locked to the backing plate by a locking sleeve received on the sensor from the lining side of the backing plate. The locking sleeve has a shoulder portion which has an outer diameter greater than the inner diameter of the hole such that the locking sleeve abuts one side of the plate and captures the sensor. Preferably, the locking sleeve has a finger which snaps into a groove in the sensor securing the sensor to the sleeve. Most preferably, the finger and groove extend around the entire circumference of the sleeve and sensor portion.

The above-described sensor is relatively easy to assemble and is relatively inexpensive. These and other features of the present invention can be best understood from the following specification and drawings, the following which is a brief description.

DETAILED DESCRIPTION OF THE PREFERRED EMBODIMENT

Figure 1:
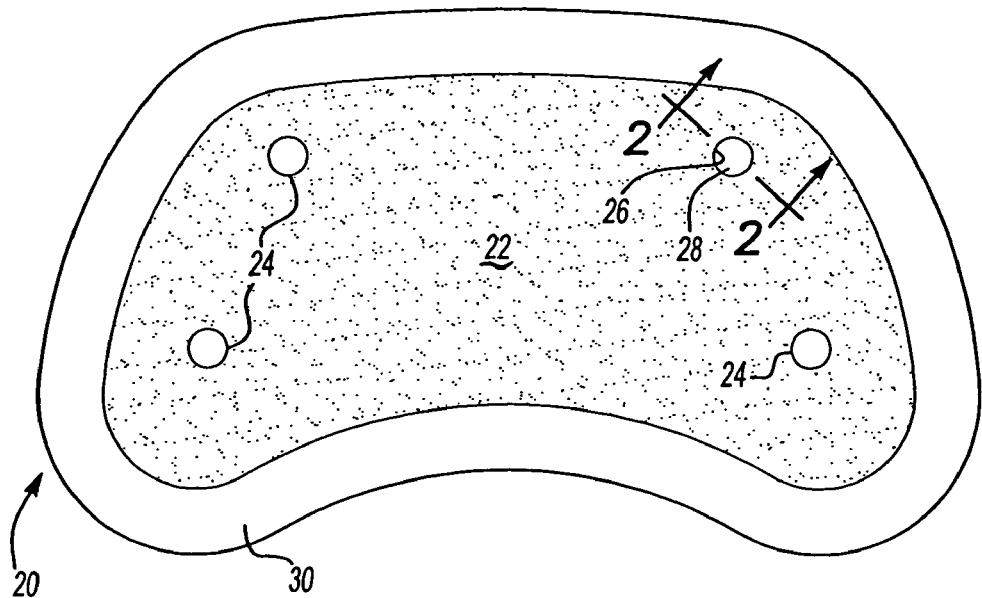
FIG. 1 is a plan view of an inventive brake pad.

FIG. 1 schematically shows a brake pad 20 incorporating a friction material face 22. A plurality of rivets 24 extend through holes in the friction material. One of the rivet holes is not provided with a rivet, but instead receives a sensor 26. Sensor 26 includes a sensor portion 28, as will be described below. Although a disc-type brake pad is shown, it should be understood this invention has equal application to cam-type brakes wherein the underlying backing plate is curved along the circumference of the wheel. Further, other type brake pads having a metal backing plate and a friction material would also benefit from this invention.

Figure 2:
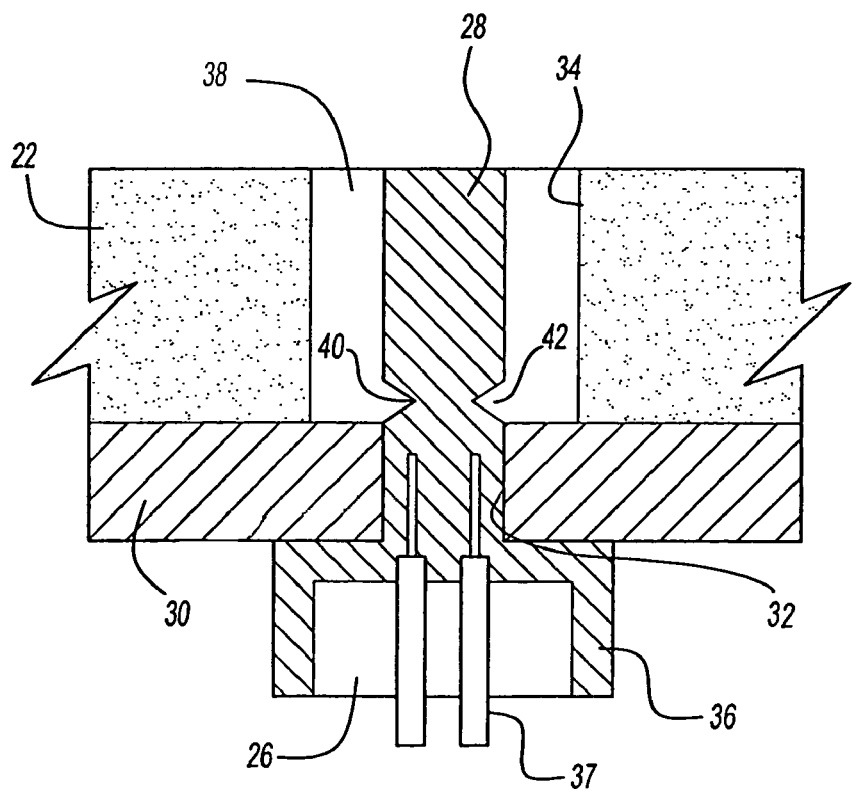
FIG. 2 is a cross-sectional view along line 2—2.

As shown in FIG. 2, the sensor 26 has its forwardly extending sensor portion 28 extending through a backing plate 30 formed behind the friction material of the brake pad 20. A hole 32 through the backing plate 30 has a first inner diameter, and a second space 34 within the friction material has a second inner diameter which is greater than the inner diameter of the hole. While the friction material is shown as being removed completely from the backing plate 30 around the vicinity of the hole 32, it may be that some friction material may still be formed, although typically of a lesser height than the height at the areas outwardly of the second space 34.

As shown, an enlarged shoulder 36 has an outer diameter which is greater than the inner diameter of the hole 32. A standard connector 37 is formed outwardly of the shoulder 36 and can receive a standard electrical connector from a control. The use of the standard connectors facilitate the attachment of the sensor into the braking system, reduces the cost of the proposed system, and further, make the system more robust than the prior art.

A sleeve 38 formed of a material such that it has similar wear characteristics to the sensor portion 28, has a locking lip 40 which snaps into a groove 42 in the sensor portion 28. As can be appreciated, the sleeve 38 has an outer diameter which is greater than the inner diameter of the hole 32. Thus, the sleeve captures the sensor by having lip 40 snap into groove 42, and the sensor is thus easily secured to the brake pad 20.

Figure 3:
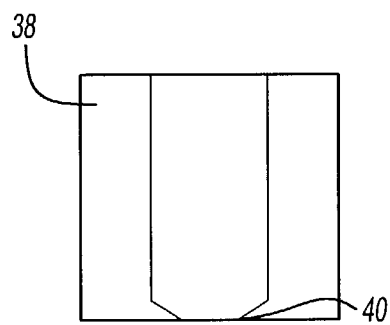
FIG. 3 is an exploded view of the sensor components of this invention.
Figure 3:
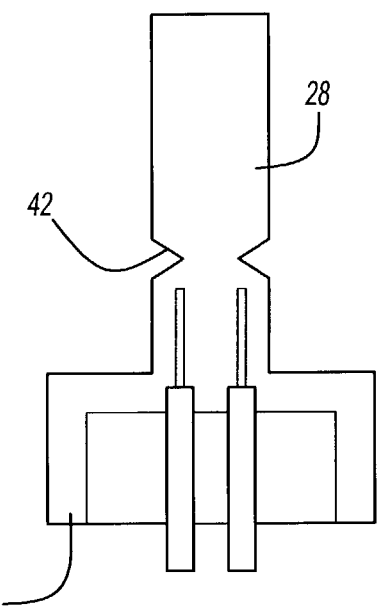

As can be appreciated from FIG. 3, the groove 42 extends around the entire circumference of the sensor portion 28 and the lip 40 also preferably extends around the entire circumference. The lip easily snaps into the groove as the sleeve is forced onto the sensor portion 28, and the sensor is thus securely held on the brake pad.

Figure 4:
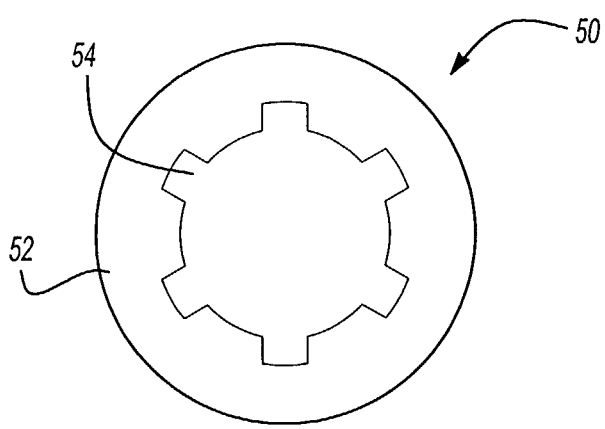
FIG. 4 shows a second embodiment.

FIG. 4 shows an alternative embodiment sleeve 50. In sleeve 50, rather than having a lip which extends around the entire circumference, there are a plurality of lip segments 52 separated by spaces 54. The lip segments may facilitate the snapping of the lip into the groove in certain instances. The size and number of segments can be modified to achieve a desired holding force.

The sensor portion 28 can be any one of several types of brake sensors, including those which have varying resistance with wear, or including the sort wherein a short circuit occurs with a predetermined amount of wear. This application goes to the packaging of the sensor, and not to the operational details.

Although a preferred embodiment of this invention has been disclosed, a worker in this art would recognize that certain modifications would come within the scope of this invention. For that reason, the following claims should be studied to determine the true scope and content of this invention.

What is claimed is:

1. A brake pad comprising:
   a backing plate formed of a metal and having at least one hole extending therethrough;
   a friction material formed on a first outer surface of said backing plate, said friction material having a hole aligned with said at least one hole in said backing plate; and
   a sensor extending through said at least one hole in said backing plate, said sensor having
   an enlarged shoulder with an outer diameter greater than an inner diameter of said at least one hole in said backing plate and abutting a second outer surface of said backing plate opposite said first outer surface, wherein said enlarged shoulder is integrated with an outer periphery of said sensor, and wherein said second outer surface of said backing plate comprises an outermost rear surface of said backing plate facing away from said friction material,
   a locking member attached to said sensor on said first outer surface of said backing plate and extending through said hole in said friction material, said locking member locking said sensor to said backing plate, said locking member having a bore, and
   a sensor portion that passes through said at least one hole in said backing plate and said hole in said friction material, wherein said sensor portion has a greatest outer diameter that can be inserted through said bore in said locking member to mount said locking member onto said sensor, wherein said locking member has an outer diameter that is greater than said inner diameter of said at least one hole in said backing plate such that said locking member abuts said first outer surface of said backing plate, and wherein said locking member is comprised of a material having similar wear characteristics as said sensor portion.

2. The brake pad as recited in claim 1, wherein said sensor portion extends forwardly from said enlarged shoulder, said locking member being a sleeve surrounding said sensor portion.

3. The brake pad as recited in claim 1, wherein one of said sensor and said locking member has a groove and the other has a lip which snaps into said groove.

4. The brake pad as recited in claim 3, wherein said groove extends around an entire circumference of said sensor.

5. The brake pad as recited in claim 1, wherein said at least one hole in said backing plate is a rivet hole, and is one of a plurality of rivet holes through said backing plate.

6. The brake pad as recited in claim 1, wherein electrical communication lines extend through said enlarged shoulder and from said sensor.

7. The brake pad as recited in claim 6, wherein said electrical communication lines extend to an electrical connector at an outer face of said enlarged shoulder.

8. The brake pad as recited in claim 1, wherein said locking member comprises a sleeve that extends along a substantial length of said sensor portion.

9. The brake pad as recited in claim 1, wherein said first outer surface of said backing plate comprises an outermost front surface of said backing plate and wherein said at least one hole has a constant diameter extending from said outermost front surface to said outermost rear surface of said backing plate.

10. The brake pad as recited in claim 1, wherein said enlarged shoulder directly abuts against said outermost rear surface of said backing plate.

11. A brake pad comprising:
    a backing plate having an outermost front surface and an outermost rear surface facing opposite of said outermost front surface;
    a sensor hole extending trough said backing plate from said outermost front surface to said outermost rear surface;
    a friction material supported by said outermost front surface, said friction material having a friction material hole aligned with said sensor hole; and
    a sensor extending through said sensor hole in said backing plate, said sensor having
    an enlarged shoulder portion defined by an outer diameter that is greater than an inner diameter of said sensor hole, said enlarged shoulder portion abutting against said outermost rear surface of said backing plate,
    a locking member attached to said sensor at said outermost front surface of said backing plate and extending trough said friction material hole, said locking member locking said sensor to said backing plate, and
    a sensor portion that extends through said sensor hole and into said friction material hole wherein said sensor portion is inserted through a bore in said locking member to mount said locking member onto said sensor, wherein said locking member has an outer diameter that is greater than said inner diameter of said sensor hole such that said locking member abuts said outermost front surface of said backing plate, wherein said locking member is configured to wear with said sensor portion and said friction material in response to a brake application, and wherein said locking member is comprised of a material that has similar wear characteristics as said sensor portion.

12. A brake pad comprising:
    a backing plate having an outermost front surface and an outermost rear surface facing opposite of said outermost front surface;
    a sensor hole extending through said backing plate from, said outermost front surface to said outermost rear surface;
    a friction material supported by said outermost front surface, said friction material having a fiction material hole aligned with said sensor hole; and a sensor extending through said sensor hole in said backing plate, said sensor having an enlarged shoulder portion defined by an outer diameter that is greater than an inner diameter of said sensor hole, said enlarged shoulder portion abutting against said outermost rear surface of said backing plate.

a locking member attached to said sensor at said outermost front surface of said backing plate and extending through said friction material hole, said locking member locking said sensor to said backing plate, and a sensor portion that extends through said sensor hole and into said friction material hole wherein said sensor portion is inserted through a bore in said locking member to mount said locking member onto said sensor, wherein said locking member has an outer diameter that is greater than said inner diameter of said sensor hole such that said locking member abuts said outermost front surface of said backing plate, and wherein said sensor portion extends outwardly from said outermost front surface of said backing plate to a distal end portion and wherein said locking member comprises a cylindrical sleeve that extends from said outermost front surface to said distal end portion.

13. The brake pad as recited in claim 12, wherein an edge of said cylindrical sleeve and said distal end portion are positioned adjacent a wear surface of said friction material.

14. The brake pad as recited in claim 11, wherein one of said sensor and said locking member has a groove and the other of said sensor and said locking member has a lip that snaps into said groove.

15. The brake pad as recited in claim 11, wherein said sensor hole has a constant diameter from said outermost front surface to said outermost rear surface.

* * * * *

UNITED STATES PATENT AND TRADEMARK OFFICE
CERTIFICATE OF CORRECTION

PATENT NO. : 7,011,185 B2 Page 1 of 1
APPLICATION NO. : 10/225994
DATED : March 14, 2006
INVENTOR(S) : Kramer, Dennis A.

It is certified that error appears in the above-identified patent and that said Letters Patent is hereby corrected as shown below:

Column 4:
Lines 26 and 41: Please delete "trough" and replace with --through--.

Line 66: Please delete "fiction" and replace with --friction--

Signed and Sealed this

Fifteenth Day of August, 2006

JON W. DUDAS
*Director of the United States Patent and Trademark Office*